April 29, 1969

V. S. DURBIN 3,440,694

WIRE ROPE CLIP

Filed Nov. 24, 1967

INVENTOR:
VOTAW S. DURBIN
BY
Cohn and Powell
ATTORNEYS

# United States Patent Office 3,440,694
Patented Apr. 29, 1969

3,440,694
WIRE ROPE CLIP
Votaw S. Durbin, c/o Durbin Durco Inc., 1435 Woodson
Road, St. Louis, Mo. 63132
Filed Nov. 24, 1967, Ser. No. 685,520
Int. Cl. F16g 11/06
U.S. Cl. 24—125               6 Claims

ABSTRACT OF THE DISCLOSURE

The clip includes a channel member providing a base and a pair of opposing flanges, the base having a pair of holes for receiving a U-bolt. A pair of shear cuts in each leg provide opposing tabs which are bent inwardly and downwardly to form a seating pad overlying the base and located between the bolt holes. The slots which remain in the opposed flanges, when the tabs are downwardly bent, receive a pair of wire rope lengths superimposed one on the other. The wire rope lengths are subjected to clamping pressure between the U-bolt and the seating pad and are kinked into conformity with a centrally depressed configuration of the pad.

Background of the invention

This invention relates generally to a clip for clamping wire rope lengths or cables together, and more particularly to a wire rope clip which is formed by stamping from sheet metal.

Wire rope clips or cable clamps which utilize a U-bolt to clamp wire rope lengths have been used for many years. However, these clamps invariably require a base which is cast, and is therefore relatively expensive. This expense is in part caused by the fact that the molds required are small, and that the surface configuration of the base is generally fairly complex.

The results obtaining from clips manufactured as stampings have heretofore been disappointing. One reason for this is the fact that the material from which the stamping is made is, generally speaking, of uniform thickness. The applied forces acting on the clip produce varied stresses within the clip, and a uniform thickness of material has not, practically speaking, provided adequate structural strength in the clip as a whole.

Applicant has resolved this problem by providing a stamping which utilizes enfolded sheet material at points where a greater structural strength is required so as to enhance the strength of the clip in both directions.

In addition, the structure of the enfolded material is provided with a configuration such as to augment the clamping action of the U-bolt upon the wire rope lengths. The present wire rope clip base has the structural advantages of a cast or molded base with respect to strength and configuration, and yet retains the relatively simple production and cost characteristics of a stamped item.

Summary of the invention

The clip includes a base having a pair of spaced holes, and opposing flanges outwardly projecting from the base, the flanges including a pair of oppositely facing slots disposed between the spaced holes and adapted to receive the wire rope lengths. A seating pad overlies the base adjacent to the slots, the seating pad being selectively formed from the flanges.

A U-bolt having parallel legs is received in the spaced holes, the legs projecting through the base, each leg includes a nut. The U-bolt and the seating pad cooperate to retain the wire rope lengths in clamped relation when the nuts are tightened.

The seating pad includes a pair of opposed tabs inwardly turned from the flanges to provide the slots. Each tab has a bearing face raised from the base further than the remaining tab bearing portions, the raised bearing faces being disposed between the slots on opposite sides of a center line interconnecting the holes. The bight of the U-bolt between the raised bearing faces kinks the wire rope lengths to preclude relative movement between the wire rope lengths and the clip, thereby facilitating the clamping action.

A unitary channel-shaped member provides the base and the flanges, the channel flanges being disposed in parallel relation to the center line interconnecting the holes.

The slots are defined by a pair of shear cuts drawn laterally of each flange, and the seating pad includes a pair of tabs formed from the flange portions between the shear cuts, the tabs being inwardly and downwardly turned toward each other.

The free end of each tab is lower than the attached end to provide the raised bearing faces, the bearing faces being disposed on opposite sides of the interconnection line between the holes, and being aligned with the slots in a direction substantially normal to the alignment of the holes.

The bending of the tabs creates a pair of bights providing a curvilinear seating pad including a pair of raised bearing faces with a depression therebetween. The U-bolt acting between the raised bearing faces of the seating pad kinks the wire rope lengths to conform to the configuration of the depression, thereby to preclude relative movement between the wire rope lengths and the clip and to facilitate clamping action.

Description of the preferred embodiments

Figure 1:
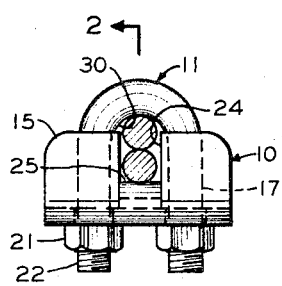
FIG. 1 is an elevational view of the clip, illustrating the clamping of a pair of wire rope lengths together.

Referring now by characters of reference to the drawing, and first to FIG. 1, it will be understood that the wire rope clip includes a substantially channel-shaped member 10 and a U-bolt 11 which, in the particular example shown, cooperate to clamp together a pair of wire rope lengths 12 and 13.

The channel-shaped member 10 includes a base 14 and a pair of outwardly projecting flanges 15. The base 14 includes a pair of spaced holes 16 receiving the legs 17 of the U-bolt 11. The legs 17 project outwardly beyond the underside 20 of the base 14. A nut 21 is threadedly attached to the projecting portion 22 of each bolt leg 17. Each flange 15 includes a pair of opposing shear cuts 23 which define a pair of oppositely facing slots 24 adapted to receive the wire rope lengths 12 and 13. The flange portions between the lateral shear cuts 23 provide a pair of opposed tabs 25 inwardly turned from the flanges 15 to provide a seating pad for the lower wire rope length 13.

Figure 2:
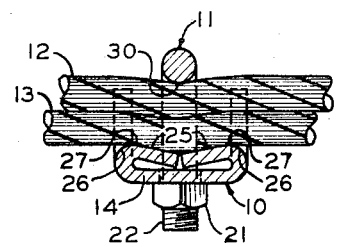
FIG. 2 is a sectional view taken on line 2—2 of FIG. 1, and illustrating in particular the formation of the seating pad.

As is clearly illustrated in FIG. 2, the free end of each tab 25 is closer to the base than the bight 26. Thus the bight 26 of each tab 25 provides a pair of oppositely disposed, raised bearing faces 27 transversely aligned with the slots 24.

This arrangement of raised bearing faces 27 provides a curvilinear surface for the seating pad. Because each raised bearing face 27 is disposed laterally from the line interconnecting the spaced holes 16 of the base 14, the bight 30 of the U-bolt 11 acts to kink the wire rope lengths 12 and 13 into the depression therebetween when the nuts 21 are tightened against the underside 20 of the base 14. This action is substantially caused by the fact that the raised bearing faces 27 support wire rope lengths 12 and 13 in the manner of a simple beam, and the tightening of the nuts 21 applies a force to the midpoint of the wire rope lengths to deflect them to conform to the curvilinear configuration of the seating pad, and thus facilitates the clamping action of the U-bolts 11 upon the wire rope lengths 12 and 13. This arrangement is well illustrated in FIG. 2. If desired, the surface of the seating pad may be provided with serrations to further augment the clamping action.

Figure 3:
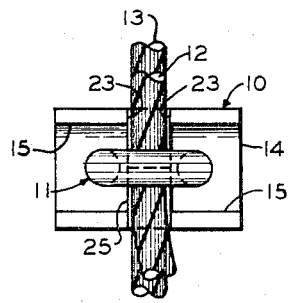
FIG. 3 is a top plan of the wire rope clip.
Figure 4:
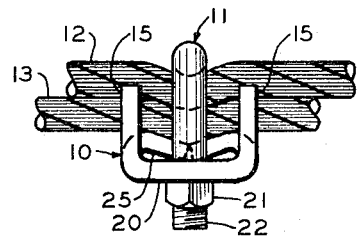
FIG. 4 is an end elevational view taken on line 4—4 of FIG. 1.

It is noteworthy that by shearing the flange to form the tabs, rather than forming them by saw-cuts, the strength of the clip is enhanced considerably. One reason for this is that the bight 26 of each tab 25 closely abuts the margins formed by the cuts 23 of the flanges 15, and in consequence, the tendency of the base 14 to bend because of the downward action of the U-bolt 11 between the spaced holes 16 (FIGS. 1 and 3) and the subdivided flanges 15 to move inward, is resisted by the material of the bight 27 of the tabs 25 which are in compression between the sides of the slots 24. The use of relatively wide saw-cuts would permit bending to occur to a much greater extent. The arrangement of the tabs thus strengthens the clip in a direction perpendicular to the axes of the wire rope lengths 12 and 13. It will be clear that the formation of the tabs 25 into a seating pad strengthens the clip in the opposite direction also because of the double thickness of metal and because the tabs 25 substantially abut each other. Thus, the tabs 25 increase the buckling resistance of the channel member 10 and hence the clip as a whole, in both directions.

It is thought that the functional advantages of this wire rope clip have become fully apparent from the foregoing description of parts, but for completeness of disclosure, the preferred fashioning and usage of the clip will be briefly described.

The base 14 of the clip is made of sheet metal and is formed into the channel-shaped member 10 which includes the base 20 and the pair of opposing flanges 15. The pair of opposing shear cuts 23 are made on each flange 15, and the material therebetween which forms tab 25, is pressed inwardly and downwardly to form the seating pad for the wire rope lengths 12 and 13. The wire rope lengths 12 and 13, which are to be clamped together, are received in the opposing slots 24 created in the flanges 15 by the turning down of the tabs 25. The wire rope lengths 12 and 13, it will be observed, are received within the slots 24 and are disposed in vertical relation, and that opposing margins formed by shear cuts 23 of the slots 24 preclude lateral movement of the wire rope lengths 12 and 13.

The U-bolt 11 is placed in straddling relation to the wire rope lengths 12 and 13, the legs 17 of the U-bolt 11 being received in a pair of pre-formed, spaced holes 16 on either side of the wire rope lengths. The ends 22 of the bolt legs 17 project beyond the underside 20 of the base 14 and nuts 21 are threadedly attached to the U-bolt 11. Tightening the nuts 21 produces a clamping action between the bight 30 of the U-bolt 11 and the seating pad formed by the downwardly turned tabs 25. As seen in FIG. 2, the wire rope lengths 12 and 13 are kinked into conformance with the general curvilinear shape of the seating pad, and when clamped securely in such position are precluded from movement both laterally and longitudinally.

Although the invention has been described by making detailed reference to a single preferred embodiment, such detail is to be understood in an instructive rather than in any restrictive sense, many variants being possible within the scope of the claims hereunto appended.

I claim as my invention:

1. A wire rope clip comprising:
 (a) a base including a pair of spaced holes,
 (b) opposed flanges projecting outwardly from the base, the flanges being provided with a pair of oppositely facing slots disposed between the holes and adapted to receive wire rope lengths,
 (c) a seating pad overlying the base adjacent to the slots and selectively cut and formed from at least one of the flanges to provide at least one of the slots,
 (d) a U-bolt including a pair of legs received in the spaced holes and attached to the base, and
 (e) the U-bolt and the seating pad retaining the wire rope lengths in clamped relation therebetween when the U-bolt is tightened.

2. A wire rope clip comprising:
 (a) a base including a pair of spaced holes,
 (b) opposed flanges projecting outwardly from the base, the flanges being provided with a pair of oppositely facing slots disposed between the holes and adapted to receive wire rope lengths,
 (c) a seating pad overlying the base adjacent to the slots and selectively formed from at least one of the flanges,
 (d) a U-bolt including a pair of legs received in the spaced holes and attached to the base,
 (e) the U-bolt and the seating pad retaining the wire rope lengths in clamped relation therebetween when the U-bolt is tightened,
 (f) the seating pad including a pair of opposed tabs inwardly turned from the flanges to provide the slots, and
 (g) the tabs providing ends closer to the base than bearing faces located adjacent the slots.

3. A wire rope clip as defined in claim 2, in which:
 (h) the slots are aligned in a direction substantially normal to a center line passed between the holes,
 (i) the bearing faces are disposed on each side of the center line between the holes, the bearing faces being adapted to support the wire rope lengths,
 (j) the tab ends are closely adjacent each other and provide a depressed position of the seating pad, and
 (k) the U-bolt is adapted to kink the wire rope lengths into contact with the depressed pad portion to preclude relative movement of the wire rope lengths and the clip, and thereby facilitate the clamping action.

4. A wire rope clip comprising:
 (a) a base including a pair of spaced holes,
 (b) opposed flanges projecting outwardly from the base, the flanges being provided with a pair of oppositely facing slots disposed between the holes and adapted to receive wire rope lengths,
 (c) a seating pad overlying the base adjacent to the slots and selectively formed from at least one of the flanges,
 (d) a U-bolt including a pair of legs received in the spaced holes and attached to the base,
 (e) the U-bolt and the seating pad retaining the wire rope lengths in clamped relation therebetween when the U-bolt is tightened,
 (f) a unitary channel-shaped member providing the base and the flanges,
 (g) the channel flanges being disposed in substantially parallel relation to a center line passed between the holes,
 (h) the slots being defined by a pair of shear cuts drawn laterally of each flange,
 (i) the seating pad including a pair of tabs provided by flange portions between the shear cuts, the tabs being inwardly and downwardly turned toward each other, and
 (j) each tab having a free end closer to the base than the end adjacent the slot to provide a pair of raised bearing faces oppositely disposed on each side of the center line between the holes and aligned with the slots.

5. A wire rope clip as defined in claim 4, in which:
 (k) the tabs provides a curvilinear bearing face including a pair of raised bearing faces with a depression therebetween, and (1) the U-bolt, acting between the raised faces, is adapted to kink the wire rope lengths to conform to the depression, thereby to preclude relative movement between the wire rope lengths and the clip to facilitate the clamping action.

6. A method of clamping wire rope lengths comprising the steps of:
   (a) stamping sheet metal into a channel shape,
   (b) forming a pair of oppositely disposed holes in the bight of the channel,
   (c) shearing a pair of cuts in each channel flange to form a tab between each pair of cuts, the tabs being oppositely disposed between the holes,
   (d) pressing each tab inwardly and downwardly of the channel to form a pair of raised bearing faces with a depression therebetween and to create opposing slots in each side wall,
   (e) mounting a pair of vertically related wire rope lengths in the slots supported on the raised bearing faces,
   (f) inserting each leg of a U-bolt into one of the holes and straddling the wire rope lengths to support the wire rope lengths between the bight of the U-bolt and the raised bearing faces, and
   (g) tightening nuts on the U-bolt to apply pressure to the wire rope lengths between the raised bearing surfaces and thereby kink the wire rope lengths into the depression.

References Cited

FOREIGN PATENTS 208,817   6/1957   Australia.
879,358   2/1943   France.
905,930  12/1945   France.

BERNARD A. GELAK, *Primary Examiner.*

U.S. Cl. X.R.

339—265; 29—526